United States Patent
Wagner

(10) Patent No.: US 8,374,438 B1
(45) Date of Patent: *Feb. 12, 2013

(54) VISUAL TEMPLATE-BASED THERMAL INSPECTION SYSTEM

(75) Inventor: Matthias Wagner, Cambridge, MA (US)

(73) Assignee: Redshift Systems Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/370,558

(22) Filed: Feb. 10, 2012

Related U.S. Application Data

(63) Continuation of application No. 12/245,932, filed on Oct. 6, 2008, now abandoned.

(60) Provisional application No. 60/977,472, filed on Oct. 4, 2007, provisional application No. 61/027,616, filed on Feb. 11, 2008.

(51) Int. Cl.
*G06K 9/00* (2006.01)
*H04N 5/33* (2006.01)
*H01L 25/00* (2006.01)
*G03F 1/01* (2006.01)

(52) U.S. Cl. ........ 382/209; 382/100; 382/106; 430/964; 348/E5.09; 250/332; 250/330

(58) Field of Classification Search .................. 382/209, 382/100, 115, 118, 128, 117, 103, 106; 250/332, 250/334, 342, 330, 338.1; 348/164, E5.09, 348/E3.01, 166, E5.081, 263, 239, 167, 168; 340/522, 587, 632, 577, 628; 374/124, 100, 374/120, E13.001, E13.002, E13.003, 121, 374/130; 430/201, 964, 944, 339, 522, 517, 430/203, 351, 559, 617, 955, 200, 510; 359/362, 359/399, 421, 350

See application file for complete search history.

(56) References Cited

U.S. PATENT DOCUMENTS

| | | | | |
|---|---|---|---|---|
| 4,939,369 A | * | 7/1990 | Elabd | 250/332 |
| 5,725,989 A | | 3/1998 | Chang et al. | |
| 6,384,414 B1 | * | 5/2002 | Fisher et al. | 250/339.14 |
| 6,972,419 B2 | * | 12/2005 | Tejnil | 250/492.2 |
| 7,280,678 B2 | * | 10/2007 | Haven et al. | 382/117 |
| 7,457,441 B2 | * | 11/2008 | Hartlove | 382/117 |
| 7,535,002 B2 | | 5/2009 | Johnson et al. | |
| 7,538,326 B2 | * | 5/2009 | Johnson et al. | 250/370.08 |
| 7,561,181 B2 | * | 7/2009 | Schofield et al. | 348/148 |
| 7,651,261 B2 | | 1/2010 | Bunker et al. | |
| 7,983,446 B2 | | 7/2011 | Wiedemann et al. | |
| 2004/0264542 A1 | | 12/2004 | Kienitz | |
| 2008/0099678 A1 | | 5/2008 | Johnson et al. | |

OTHER PUBLICATIONS

Fluke Corporation, "The Fluke 576 Photographic Non-Contact Thermometer Infrared Temperature Measurement with Digital Photos," 2005, 2008.

* cited by examiner

*Primary Examiner* — Sheela Chawan
(74) *Attorney, Agent, or Firm* — BainwoodHuang

(57) ABSTRACT

An imaging device and system include integration of an imaging camera (visible-light or near-infrared) with a thermal infrared sensor, capturing a baseline image from this camera simultaneously with acquisition of baseline thermal infrared data, which may correspond to a known good condition or part, automatic generation of an edge version of the baseline image for use as an alignment template, and on subsequent thermal infrared inspections, superposition of the alignment template on a live video image from the visible camera, so as to facilitate highly repeatable alignment of the thermal infrared sensor to an object being inspected.

14 Claims, 8 Drawing Sheets

VISUAL TEMPLATE-BASED THERMAL INSPECTION SYSTEM

BACKGROUND

Infrared thermal measurement and thermal imaging are widely used for predictive and preventative maintenance operations because of their ability to image lost energy which may result from poor electrical connections, mechanical friction, electrical or mechanical overloads, or other failing components.

In many cases, thermographic inspections are done regularly on electrical and mechanical equipment within a building or plant. The resulting data is reviewed for obvious problems (hot spots) which indicate imminent failure. In addition, the data may be compared to an established baseline, or trended over time to look for early warning signs. Such trend-based results may enable changes which prevent a failure altogether, or allow changes at the next scheduled maintenance.

In other cases, many different items of the same or similar type are thermographically screened over time, as might be the case with electrical/mechanical equipment production, engine maintenance in fleets, or field service of heavy equipment. In this case again, obvious hot spots may be easily identified, but more subtle anomalies must be identified with baseline data from a "known good" product, or using trend data from repetitive visits to the equipment in question.

Some companies offer thermal infrared inspection tools which include visible cameras. For instance, the Fluke 576 data-logging infrared spot thermometer is identical to the Fluke 574 data-logging spot thermometer except for the addition of a visible camera, for an additional $700 or more (at retail). Both of these instruments are suitable for repeated inspection of equipment within a plant, or of many identical pieces of equipment (hence the data-logging function). In addition this product—as almost any infrared spot thermometer does—includes a laser designator corresponding to the spot being measured. For the purpose of alignment, the user is advised to print a photo showing the laser spot(s) and then use it as a reference for future inspections. Besides the impracticality of carrying a large book of photos around a plant, the position of a laser spot on the object of interest does not uniquely determine sensor position vis-à-vis the object, causing potential discrepancies between measurements.

Similarly, thermal infrared inspection cameras are offered with the option to add visible imaging to enable "fusion" displays in real-time, and offline reporting—typically at costs of thousands of additional dollars. However, no alignment tools have been integrated into these cameras, and users must still resort to looking back and forth to the baseline image (on a piece of paper). As a result, the effectiveness of these inspection tools—often upwards of $10,000 in price—is dramatically limited because no current-vs.-baseline or trending analysis can be done in the field, and such trend analysis is complex and time-consuming even after the infrared image data has been loaded onto a PC for off-line analysis (because often a human must manually match new images with the baseline). This limits the applicability of these products to expert users leaving a large reserve of technicians underutilized.

SUMMARY

To reliably measure the temperature and temperature distribution of on object of interest against a baseline or trend, it is important to match which areas are being compared in recent and baseline images. In the prior art, images are compared side-by-side, possibly with the aid of PC-based "region of interest" selection tools which allow the user to select corresponding areas in a sequence of images.

Such comparison restricts the trending and current-vs.-baseline analysis to post-collection processing on a PC or similar platform. Moreover, it can make such comparison extremely time-consuming. Finally, because images may be taken from different angles or distances, radiated energy may be different and difficult if not impossible to compare to a baseline or historical data. In addition to variable occlusion of objects, there is the potential for changes in perceived temperature due to infrared sensor angle vs. surface—for objects with less than 100% emissivity, radiated energy may vary substantially with viewing angle.

In order to minimize variations in the images to be compared, some industrial users have taken to putting tape outlines on the floor in front of equipment to be monitored. While this eliminates gross variations in images captured, significant changes from dataset to dataset will occur due to tool elevation, angle, rotation, and of course user height and tool holding style.

In accordance with the present invention, a system is described by which precise alignment may be achieved between successive thermal infrared measurements of an object of interest (or of several identical objects), which enables rapid comparison to baseline data, trending of data, and better real-time, on-site interpretation (even by non-experts) of thermal data so that the resulting information can immediately be acted upon.

The system generally includes the following:
1) Integration of an imaging camera (e.g., visible-light or near-infrared) into a thermal infrared imaging device, and registration of the imaging camera to a thermal infrared sensor in the imaging device;
2) Capture of a baseline image from the imaging camera simultaneously with acquisition of baseline thermal infrared data, which may correspond to a known good condition or part for example;
3) Automatic generation of an "edge" version of this baseline image using one of many well-known methods of generating edge images, for use as an "alignment template"; and
4) On subsequent thermal infrared inspections, superposition of the alignment template on a live video image from the imaging camera, so as to facilitate highly repeatable alignment of the thermal infrared sensor to the object of interest in order to facilitate direct comparison between the baseline thermal infrared data and newly acquired thermal infrared data.

The system may optionally include the following:
5) Visual or audible feedback as to the "goodness of alignment," based on comparison of the stored alignment template with a visible edge image generated in real time;
6) On-board thermal infrared analysis enabled by the use of this template alignment system, including but not limited to:
   a) Generation of "differential" thermal infrared data which shows a comparison of the newly-acquired thermal infrared data with the baseline thermal infrared data for rapid determinations of deviations in temperature or temperature distribution on the object of interest.
   b) If used with a thermal infrared imaging sensor, determination of temperature within pre-set spatial regions of interest corresponding to critical points on the object of interest, and operations such as subtraction (to examine gradients) or averaging.
  i) These regions of interest and operations may be set up based on the baseline and baseline template, either within the thermal infrared imaging device or using off-line software.
  c) If used with thermal infrared imaging sensor, compensation for emissivity on a region-by-region basis to produce and display an emissivity-corrected image in real time.
    i) Emissivity in each region may be set with the help of the raw baseline visible image, using off-line software which allows the user to "paint" varying emissivities using knowledge of the material properties (depending on the sophistication of the thermal infrared imaging device, this could be integrated into the device).

It should be noted that a similar baseline template could be generated using a near-infrared camera instead of a visible camera, or even from a thermal infrared image when the system employs an infrared imager (not a spot thermometer). Generation of the template using the visible light sensor has a number of advantages including: typically higher spatial resolution in visible light cameras vs. thermal infrared imagers; potentially higher contrast in the face of thermal conduction and convection and low temperature gradients; higher signal-to-noise ratio (as long as proper illumination is provided).

The edge image can be produced automatically in a number of manners using well-known image processing techniques. For example, a linear edge filter may be convolved with the image, producing another image which has large values in areas where color or brightness values vary rapidly; this resulting image may then be thresholded to produce a binary edge representation of the scene.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The entire content of the following U.S. Provisional Patent Applications is incorporated by reference herein: (1) 60/977,472 filed on Oct. 4, 2007, entitled, "VISUAL TEMPLATE-BASED THERMAL INSPECTION SYSTEM"; (2) 61/027,616 filed on Feb. 11, 2008, entitled, "SYSTEM FOR AUTOMATIC ALIGNMENT OF THERMAL AND VISIBLE IMAGES".

Figure 1:
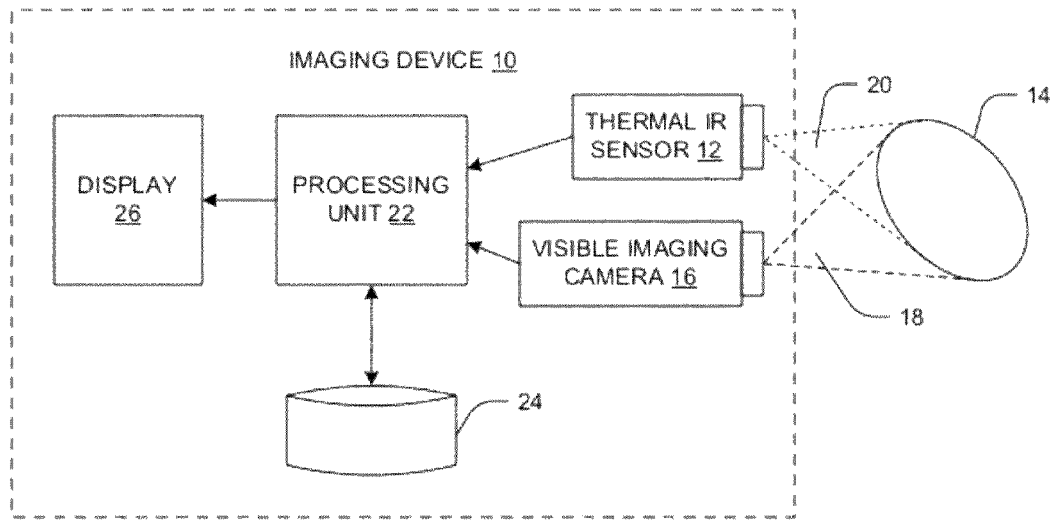
FIG. 1 is a block diagram of an imaging device.

FIG. 1 shows an embodiment in the form of a portable imaging device 10. A thermal infrared sensor 12 captures apparent surface temperature information (based on amount of infrared radiation) from an object of interest 14. The thermal infrared sensor 12 may be a single-element "spot thermometer" type sensor, or an imaging sensor with multiple pixels (e.g., two-dimensional). A visible imaging camera 16 captures a visible image of the object of interest 14, with the area 18 observed by the visible imaging camera 16 not necessarily being identical to the area 20 observed by the thermal infrared sensor 12, but generally with a large enough field of view to observe multiple areas which can act as reference points for future thermal readings. Thermal infrared sensor data from the sensor 12 and visible image data from the camera 16 are both transmitted to a processing unit 22, which has access to non-volatile memory 24. The non-volatile memory 24 stores a reference edge image obtained by edge-processing of the visible image captured during reference thermal data capture, as described below. During use of the imaging device 10 by a user, the processing unit 22 produces a composite image which is transmitted to a display 26. The composite image superimposes or otherwise blends the reference edge image with real-time image and/or thermal data coming from the infrared sensor 12 and visible imaging camera 16. The information displayed may include but is not limited to:

Superposition of the reference edge image on a live visible image being produced by the visible imaging camera 16 (example described below);

Superposition of the reference edge image on an edge-enhanced version of the live visible image being produced by the visible imaging camera;

Superposition of the reference edge image on a blended visible and thermal image;

Visible indications of "goodness of match" between a live edge-enhanced image and the reference edge image, in order to guide the user to the correct orientation of the imaging device 10 versus the object of interest (audible indications may be provided as well); and Visible indication (for example in the form of visible arrows on the screen) of a direction the user should move or rotate the imaging device 10 to re-create the conditions of the reference data capture.

During use, once the user has oriented the imaging device 10 to satisfaction, or to a point where an automated indicator as described above reaches an acceptable level, the user presses a button or trigger to capture a thermal infrared reading (or, alternatively, the device automatically captures the reading when adequate "goodness of fit" has been determined). At this point, the captured thermal infrared data has been captured from an orientation and distance identical to those for the capture of the reference thermal information. The imaging device 10 may store the new thermal data in the nonvolatile memory 24. It may further process this information using the reference thermal data, as well as any parameters that were set at the time of the reference data capture (for example, surface emissivity, ambient temperature or ambient temperature reference points in the thermal scene, etc.). It may display a comparison (for example, a temperature differential from the reference state) on the display 26. Alternatively, it may compare the computed temperature differential with thresholds established at the time of the baseline/reference capture, and output simply "In Range" or "OUT OF RANGE"/Alarm to the user, who may then take immediate corrective action. Such a simplified function could be useful for repetitive thermal infrared scans of electrical or mechanical equipment, either periodic scans of equipment in a location such as a manufacturing plant, or a spot check of a piece of equipment during field service (for example, a vehicle's engine).

Figure 2:
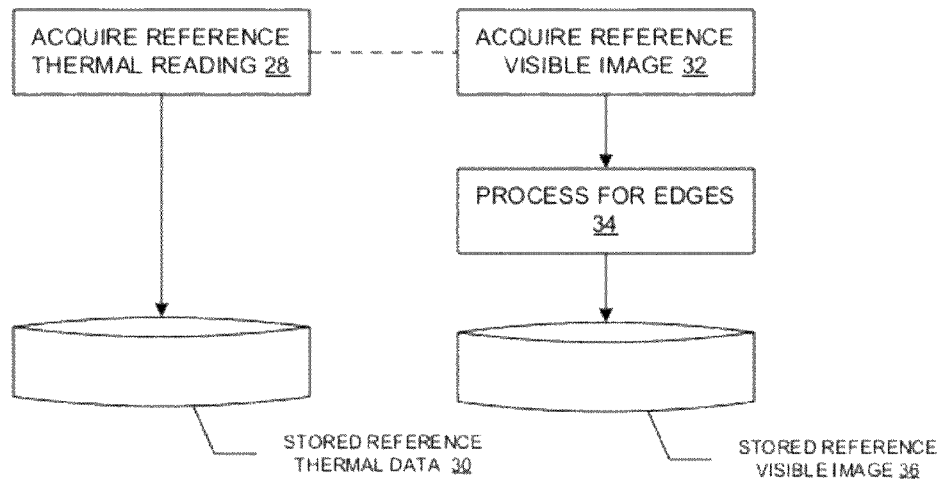
FIG. 2 is a flow diagram of a method of acquiring reference thermal and visible images.

A flow chart depicting how reference readings are acquired is shown in FIG. 2. Reference thermal infrared data (which may represent a single point taken by a spot thermometer, or a two-dimensional thermal image from a thermal imaging sensor) is acquired at 28 and stored as stored reference thermal data 30. Simultaneously, a reference visible image is captured at 32 which uniquely identifies the position and orientation of the imaging device 10 when the reference thermal data 30 was captured. At 34, the reference visible image is run through an edge-extracting filter as described above, and the resulting edge image (which may be a binary image although not necessarily) is stored as a stored reference visible image 36 in association with the stored reference thermal infrared data 30. Optionally, if there are insufficient edge features within the visible image—which could result in insufficient positional information—the imaging device 10 may warn the user and/or automatically adjust settings of the visible image camera 16 (including flash/torch settings for example) to obtain a better-quality image. In this mode the imaging device 10 may optimize the settings of the visible image camera 16 specifically to produce high-contrast edges rather than an esthetically pleasing visible image). Optionally, an unprocessed visible image may be stored as well, to provide future reference to human operators.

Figure 3:
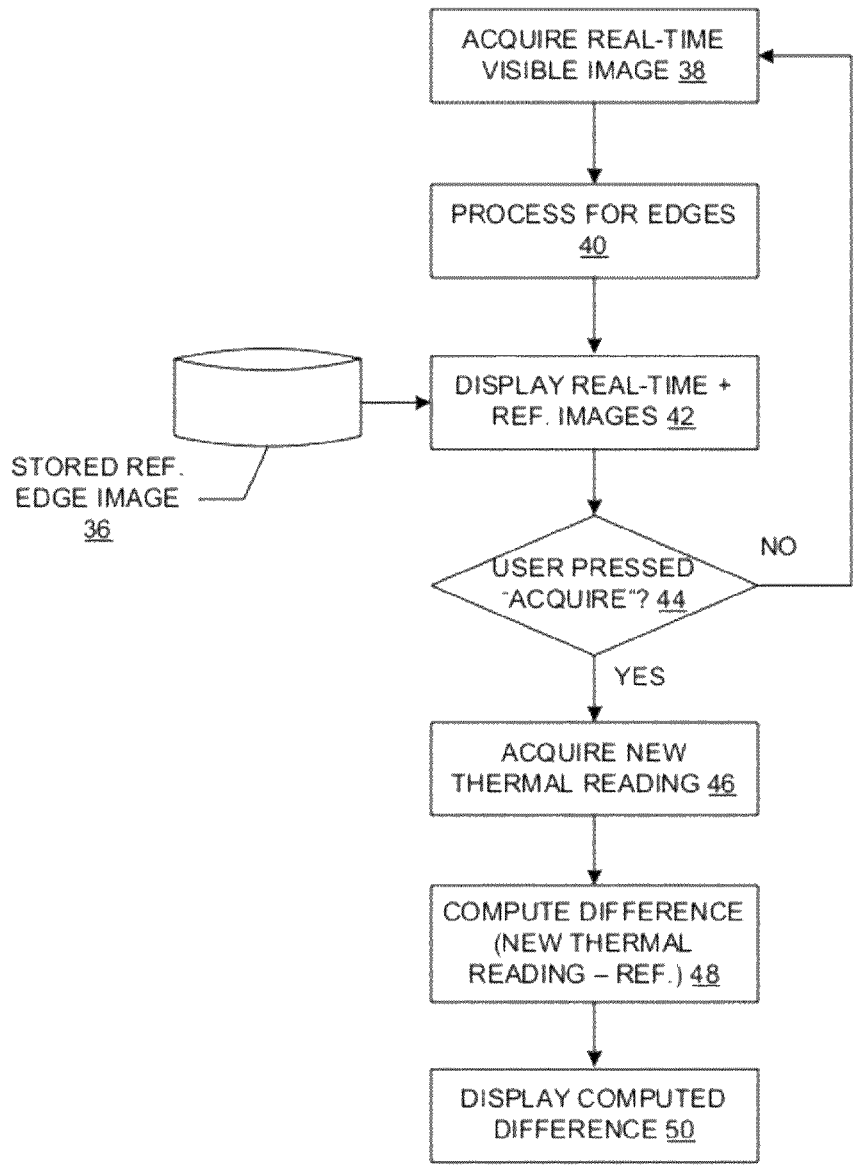
FIG. 3 is a flow diagram of a method of utilizing a stored reference image and acquired images to compare reference and new thermal infrared images.

FIG. 3 illustrates an example of the operation of the device to take subsequent thermal infrared readings from the identical position and orientation. When the user prompts the imaging device 10 (through a button press or similar input) that they wish to inspect the object in question, the imaging device 10 commences visible video acquisition (step 38); the images are (in this case) processed in real time to enhance edges (step 40), and the processed real-time video is shown with the reference visible image 36 superimposed on it (step 42), giving the user feedback on the current position and orientation of the imaging device 10 versus the reference data point. Once the user determines that the match is sufficient, he/she prompts the device 10 to acquire the thermal infrared data (steps 44-46). In this example, the system may then compute differentials between the just-acquired thermal infrared data and the reference thermal infrared data to complete the operation (step 48), and the computed differentials may be displayed (step 50).

Figure 4A:
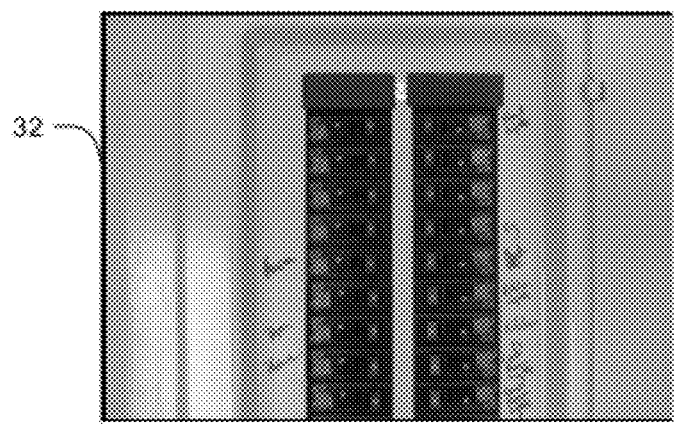
FIG. 4(a) is a reference image of an example object.
Figure 4B:
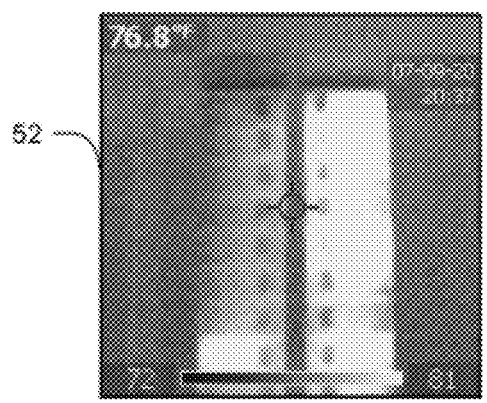
FIG. 4(b) is a reference thermal infrared image of an example object.
Figure 5:
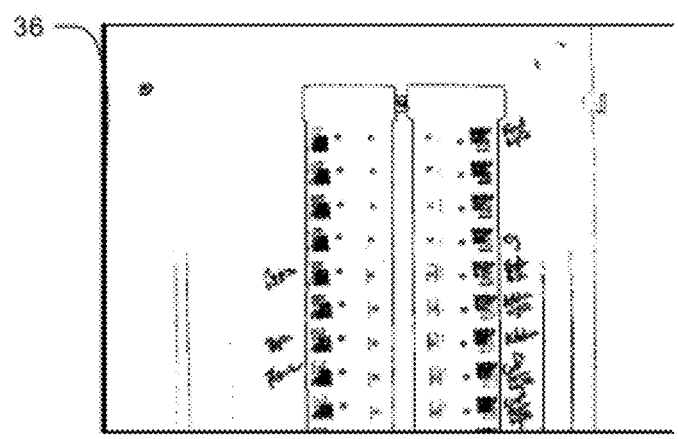
FIG. 5 is an edge-processed version of the image of FIG. 4(a)
Figure 6:
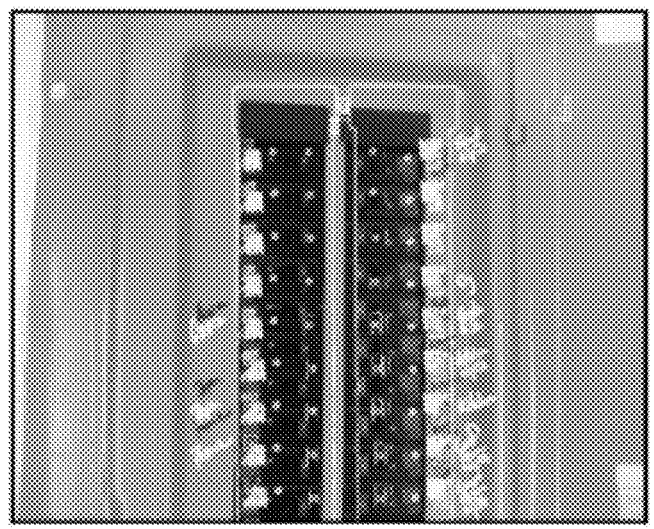
FIG. 6 is a composite of an acquired visible image of an example object overlaid with an edge-processed reference image.
Figure 7:
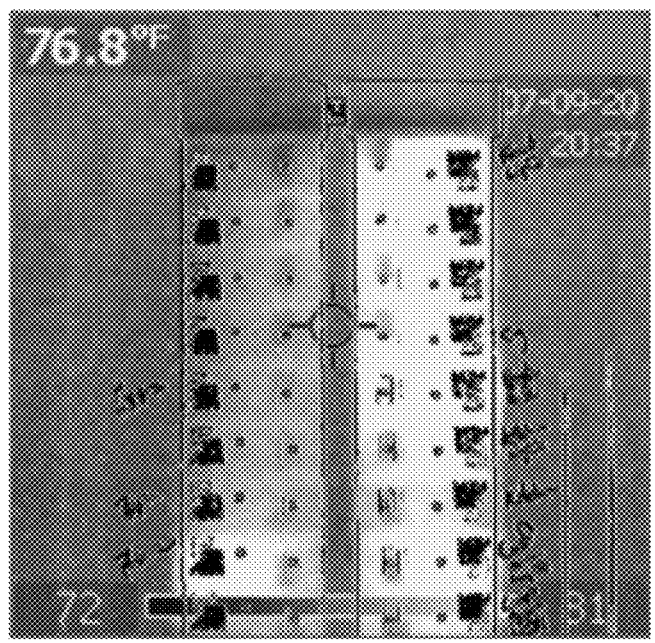
FIG. 7 is a composite of an acquired thermal infrared image of an example object overlaid with an edge-processed reference visible image.

FIGS. 4(a)-7 show example images from the processes of FIGS. 2-3. FIG. 4(a) shows a reference visible image 32 (in this case of an electrical panel with heat-generating circuit breakers). FIG. 4(b) shows a corresponding thermal infrared image 52. FIG. 5 shows a stored reference visible image 36 obtained by edge processing the image 32 of FIG. 4(a). FIG. 6 illustrates the simultaneous displaying of real-time and stored reference images of step 42 of FIG. 3 (the edges of the reference image 36 being shown in white, overlaid on a real-time acquired image of the circuit panel). In this composite image there is imperfect alignment, indicating that the current location and orientation of the imaging device 10 is not the same as at the time of capturing the reference image 32 and that therefore adjustment of the location and orientation are desirable to bring about better alignment. FIG. 7 shows the stored reference image superimposed on a real-time acquired thermal image in the case of good alignment.

Figure 8:
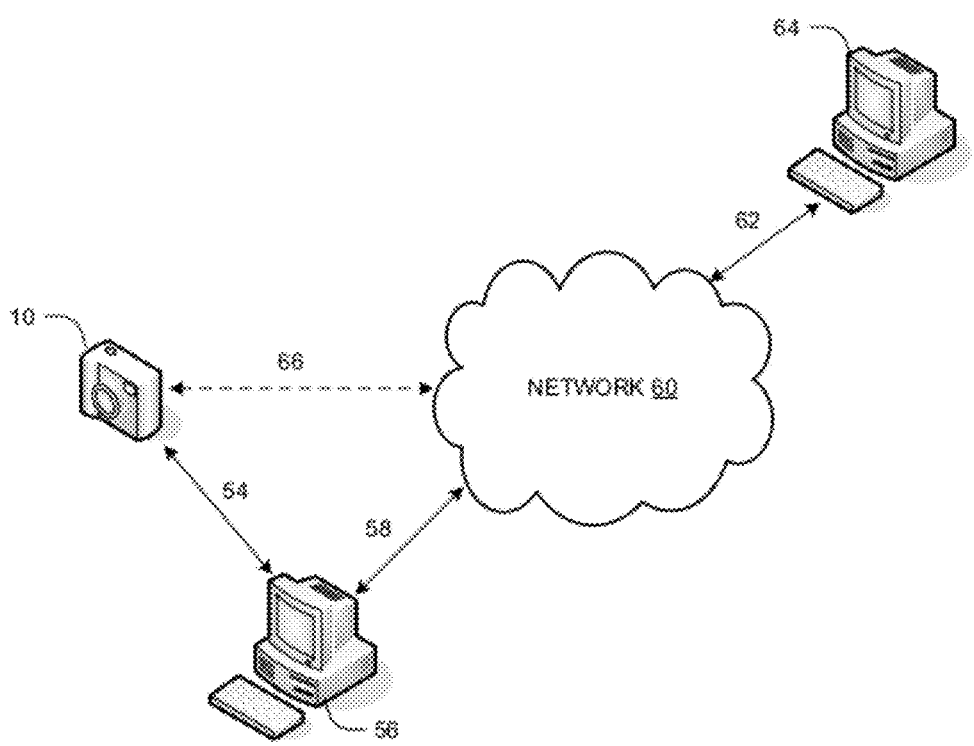
FIG. 8 is a block diagram of an image processing system employing an imaging device such as shown in FIG. 1.

FIG. 8 shows a system for accurate measurements over time or over different objects, based on the imaging device 10 described above. The imaging device 10 acquires reference thermal infrared data, which is then downloaded via a wired or wireless data link 54 to a workstation 56. The workstation 56 may store the reference thermal infrared image(s), the edge-processed reference visible image(s) and possibly the unprocessed reference visible image(s) from one or more scenes surveyed by the imaging device 10. The workstation 56 may be used by an expert and/or expert system software to set up parameters for future inspections of the same object, including estimated object thermal emissivities and ambient temperature reference points (which may be read in different region of interest in within the same thermal infrared image, in the case of a device equipped with a thermal infrared sensor, or a separate targeted infrared reading, in the case of a point thermal infrared sensor). In addition, for an imaging device 10 with an imaging thermal infrared sensor 12, multiple regions of interest may be set up within each scene. The workstation may upload the information through a wired or wireless link 58 and a network 60 for storage, processing, and other services. Such a system may include the ability to transmit the information via a network link 62 to an expert's workstation 64. The expert's workstation 64 may be used by a trained thermal infrared expert, and/or an expert on the objects/scenarios being surveyed by the imaging device 10, to set up template parameters for future inspections or to review readings from the imaging device 10 in the field where the extracted temperature limits were exceeded. This network-based system enables a range of services and capabilities, depending on the ability of the imaging device 10 to capture repeatable images for time-to-time comparisons of the same object or object-to-object differentials. Optionally, reference and real-time thermal infrared and visible image data may be transferred directly from the imaging device 10 via a wired or wireless link 66 to the network 60.

Figure 9:
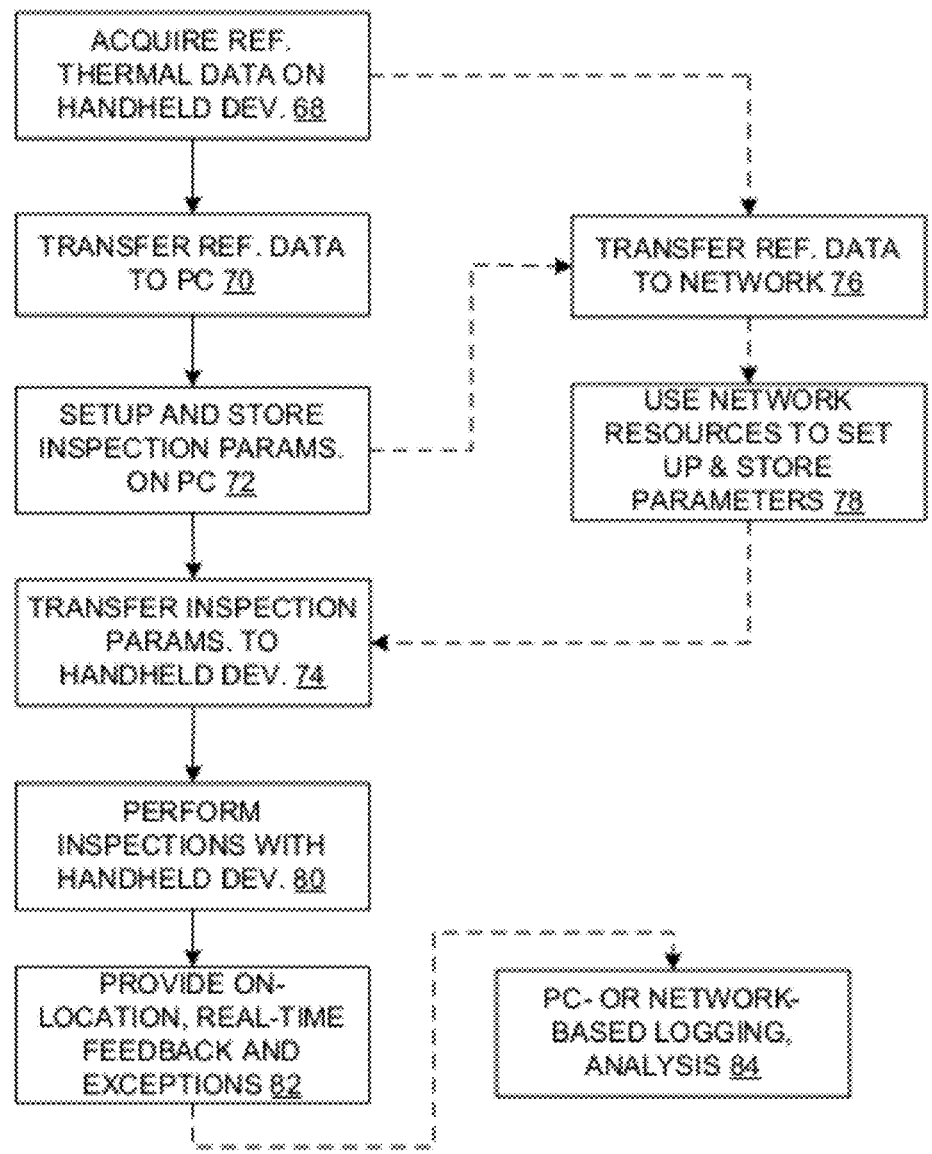
FIG. 9 is a flow diagram illustrating certain operations of the image processing system of FIG. 8.

FIG. 9 shows a flow diagram of a process for establishing reference or baseline data and parameters and subsequent inspection of objects using a system such as that of FIG. 8. In step 68, reference thermal data is acquired on the imaging device 10, and at step 70 the reference thermal data is transferred to a personal computer (PC) workstation. At step 72, the inspection parameters for the scene are set up on the workstation. These parameters may include: the definitions of regions of interest (ROIs) within a thermal infrared image; surface emissivity corrections for those ROIs; the establishment of one or more of the ROIs as ambient temperature reference points; and upper and/or lower (corrected) relative temperature limits. At step 74, these parameters are transferred to the imaging device 10 to enable real-time feedback to the user in the field—i.e., subsequent inspections taken from the same position and orientation of the device 10 are processed as set by the parameters, and the user is given good/no good or other relevant information about the object. As shown at 76 and 78, the inspection parameters may also be set up using a network-based system which may consist of expert systems, large data libraries, and experts in thermographic analysis and/or the objects of interest. Using such a system, a factory technician could walk through a facility, survey all critical electrical and mechanical equipment, simply connect the handheld device to a network interface, and have all the scenes remotely analyzed, parameterized, and have inspection parameters loaded into the device. As shown at 80-82, on subsequent inspections, the technician re-aligns the imaging device 10 based on the images from the visible camera 16, captures the thermal infrared data, and can be warned if any temperatures are out of limit or trending towards a limit. At 84, the data from the walk-through are uploaded to the network-based system for trending, more detailed analysis of unusual readings, analysis by human experts where needed, and data archiving. Such a network-based system could additionally make the data available in convenient, centralized form to the user (technician) or other parties.

Figure 10:
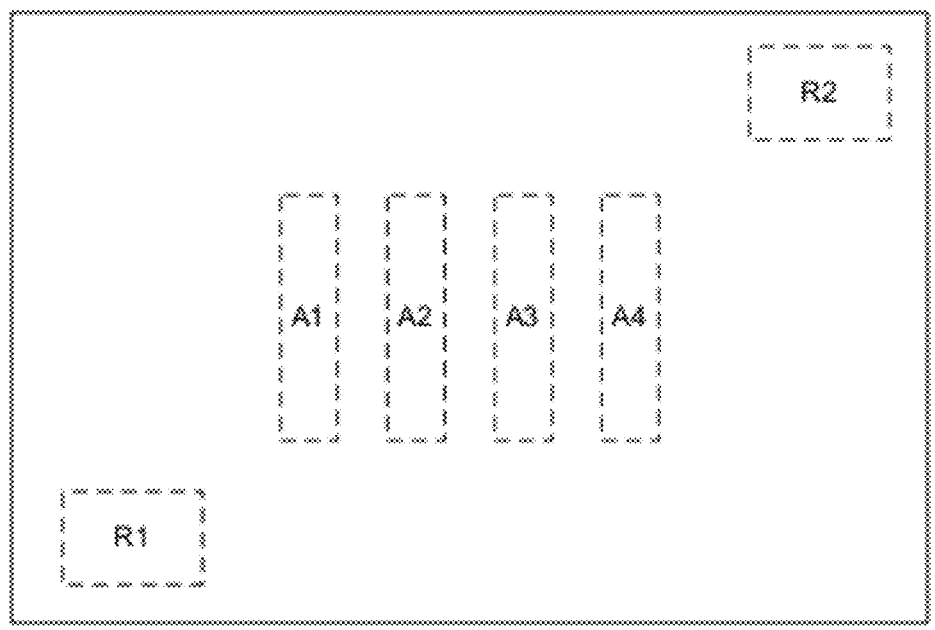
FIG. 10 is a template image identifying reference areas and areas of interest for images to be captured in the system of FIG. 9.

FIG. 10 shows an example of a template built based on reference thermal infrared imaging data (e.g., in an electrical equipment predictive maintenance scenario). Regions of interest (ROIs) R1 and R2 are selected because they are not part of the electrical elements being inspected, but should reflect ambient temperature conditions in the plant. First, R1 and R2 are designated based on the thermal image, or based on a combination of thermal and visible image data. Then, the user, expert, or expert system estimates the emissivity of the surfaces at R1 and R2, based on the type of material and surface finish apparent in the visible image. Then, areas A1 . . . A4, corresponding to four active electrical elements of interest, are designated in the image, and surface emissivity is estimated for these areas. R1 and R2 are designated as ambient references for A1 . . . A4. This means that during subsequent inspection, the average emissivity-corrected temperature indicated by R1 and R2 will be subtracted from emissivity-corrected temperatures for A1 . . . A4 in order to calculate the temperature differences between the areas A1 . . . A4 and ambient temperature. Rules may be established by which an out-of-range condition may be detected. For electrical equipment, these rules might include maximum differential from ambient for elements A1 . . . A4. If the reference thermal infrared data was taken at a pre-determined condition (e.g. electrical power loading), maximum temperature deviations from that reference condition may also be established.

A similar application of the present invention is to the field servicing of a fleet of largely identical equipment. Examples include diesel engines in generator or marine applications, transformers, power electronics, and heating/ventilation/air conditioning equipment. In this case, a reference visible edge image, along with reference thermal infrared data (images or points) is generated by the equipment originator or service organization, and inspection parameters are generated. Field technicians align handheld imaging devices 10 to the same position and angle as the reference and capture the image. Differentials are calculated and problems can be flagged in real time based on the parameters, allowing for rapid repair and saving an additional trip that would be necessitated if the data had to be analyzed remotely.

Figure 11:
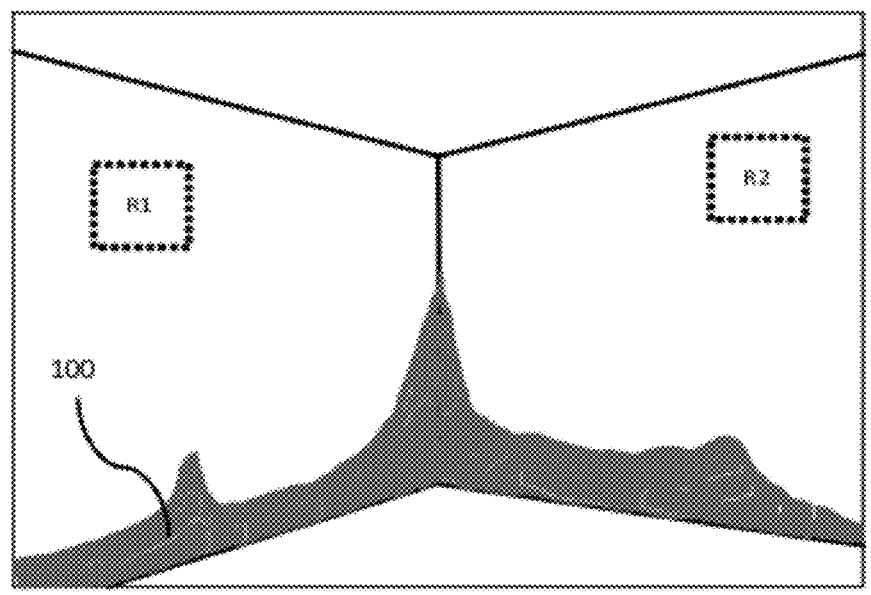
FIG. 11 is an image of a building inspection application of the imaging device of FIG. 1.

FIG. 11 illustrates an application of the present invention to building inspection. In this example, the imaging device 10 is used to monitor moisture 100 in drywall within a structure. The mode of use is as follows. An initial (reference) survey of the building is made at the start of moisture remediation operations. One or more moisture-free reference locations (e.g., R1, R2) are identified. In addition, the imaging device 10 may capture air temperature and relative humidity. Drying operations are commenced. On subsequent inspections, the user re-aligns the imaging device 10 to the same position and orientation as the reference inspection and captures another thermal image. The thermal image obtained is corrected using the temperatures of the reference points R1, R2, and compensation can also be made for relative humidity. The output image indicates progress of drying in the structure.

Other building-related applications that may benefit from the disclosed embodiments include the following:

A device or system to locate pipe breaks under concrete slab flooring. Plumbing or radiant heating pipes which break under slab flooring are a significant problem, and the breaks are often difficult to locate. Using the disclosed device/system, the user may capture reference images of flooring, then flow hot water into the piping, and return after a specified amount of time to re-image the flooring from the same position and angle. A differential thermal image can be presented immediately on the device which indicates the location of the pipe break with a warmer area.

A device or system to locate leaks in a building envelope. The user surveys the interior of a building or home, building a series of reference thermal images. A temperature difference between the interior and exterior is either naturally occurring or may be induced using heating or air conditioning (before referencing). A blower door on one or more doors or windows is activated in order to create a negative relative pressure in the building. After some time allowed to for cool or hot air from the outside to leak into the structure, the user repeats the survey of the interior, aligning the device to reference images. A differential is generated on the spot to indicate leaks in the structure.

Very similarly to the envelope leak detection system, leaks in heating or cooling ductwork, often a significant source of energy loss in homes, may be detecting using before-and-after images of ducts, vents, and ceilings/walls with these ducts behind them. Again, the ability to accurately align reference and real-time images is critical to obtaining accurate results.

Thermal/Visual Alignment in an Imaging Device

Handheld thermal infrared sensors are used extensively to measure object surface temperature for applications such as heat leak finding in structures or industrial systems and testing electrical or mechanical equipment for failures or imminent failures. Increasingly it has been found that integrating visible imaging sensors with thermal infrared sensors can be useful to provide the operator with a visible frame of reference, and in particular for documenting problems and providing a visible image for reporting purposes.

A general problem when combining thermal infrared sensor data with visible imagery is the spatial registration of this data. The optics used for thermal infrared radiation and optics used for visible image capture are generally incompatible. It is not generally feasible, in low-cost systems in particular, to have the visible image sensor co-aligned along the same axis with the thermal infrared sensor—such arrangement generally requires specialized optics or becomes very limited in capability. As a result, visible imagers and thermal infrared sensors are generally placed in close proximity with different apertures, and then "aimed" to have good registration at some pre-set distance.

A similar issue exists for another component widely packaged with thermal infrared sensors in tools: the laser pointer. Again, arranging the laser pointer to be emitted along the identical axis as the thermal infrared sensor is often impractical because of the very different wavelengths involved. In the vast majority of tools, the laser aperture is placed near the thermal infrared sensor aperture. As a result, the accuracy of the laser pointer spot—in terms of indicating where the thermal infrared sensor is gathering radiation for its measurement—is not good for objects very close to the sensor. Some tools have remedied this situation by incorporating two effective laser sources on two sides of the thermal sensor, where the patterns from the two lasers align at the point where the laser path coincides with the area being measured by the thermal infrared sensor (and, at other points, the area being measured is between the two laser points), to indicate this to the user.

A method is described by which precise registration of visible image data and thermal infrared data from separate apertures of an imaging device is enabled using only existing components in the typical system containing both visible cameras and thermal infrared sensors. The disclosed device makes use of three components already incorporated in many thermal infrared inspection tools: (1) the thermal infrared sensor (whether single-point or imaging array) to provide a thermal image of a scene, (2) the laser pointer which indicates—roughly—the center of the scene being measured using the thermal infrared sensor, and (3) a visible camera, typically used to provide a corresponding visible (and therefore easily interpreted) image of the scene, and sometimes to provide the operator a visible frame of reference in real time.

The disclosed device operates by:

Imaging an object using a thermal infrared sensor

Generating radiation ("light") using the laser pointer, either in a pulsed or continuous mode, and either automatically or through user initiation Acquiring an image of the laser light reflected from the object using the visible image sensor.

Extracting from the image the position of the reflected laser light.

Using the position on the visible image of this reflection, relative to a known position at a known distance, to calculate distance to the object being measured ("distance gauging").

Using the known positions of the visible and thermal sensors, calculating of the spatial offset at the object between the visible image and the thermal infrared image Using the spatial offset, performing real time (or non-real time) registration of the thermal and visible images Displaying the registered thermal and visible images Optionally:

For every distance gauging operation, acquiring two or more visible images in rapid succession to accurately measure laser spot location; one image or set of images with the laser off in order to provide a "background" image, and one image or set of images with the laser on. Computation of the differential of these images or sets of images to provide an accurate location for the laser spot even in the presence of other bright light sources.

Continuous operation in this mode, alternating frames with laser on and off.

Modulation of laser pulse duration in order to eliminate the effect of the laser light on the display of the visible image.

Use of a near-infrared laser, which may be observed by the visible image sensor but is invisible to the human operator and other humans in the environment.

Use of optics to project a pattern from the laser other than a simple "center spot," and provide the system depth data for multiple points in the field of view.

For example, a grid pattern extending over the entire field of view of the visible camera and/or thermal infrared sensor; the position and distortion of this grid pattern as seen by the visible camera provides multiple-point depth information. This depth information is then used to "stretch" either the thermal or visible information to register precisely at the measured points, and with interpolation between these points. More intelligence may be added to the image processing to predict where large changes in depth occur between measured points (for example, where sharp edges in the visible and/or thermal image are present).

Other solutions to the visible-thermal registration problem have been proposed and implemented. However, these require additional equipment or components beyond what would be typically required to build a thermal infrared inspection tool with an integrated visible imager.

One example is the system described by U.S. Ser. No. 11/294,752 by Johnson et al. where the user's manual focus of the thermal infrared camera component of the handheld device automatically aligns the resulting thermal image to the visible image. In this system, the point illuminated by the laser is used in conjunction with a "virtual" laser point on the screen for manual focus/alignment by the user (when the points coincide, the object of interest being designated by the laser is in focus in the thermal system). This solution solves both registration and focus problems but nonetheless has a number of shortcomings:

In low-cost, simple tools with fixed focus on the thermal infrared lens, there is no manual or automatic focus mechanism, and therefore no way to implement this solution. It would be possible to use the visible imaging module, which is available with auto-focus capability, for the same functionality. However, the autofocus drives and algorithms implemented in these modules rarely (at least for low-cost, compact modules) derive absolute distance, which is a requirement for image registration.

This solution does not extend to a model where the image can be registered at multiple points in the scene, and scenes may have a large variation in depth. Again, it would in theory be possible to use the multi-area autofocus algorithms found in visible camera modules to derive depth at multiple points in the image, but again, most visible imaging modules do not calculate or report absolute distance in their autofocus routines.

The disclosed device seeks to solve these significant issues and automate image registration in a user-transparent, focus freemanner, and in a manner which is applicable to a system without mechanical adjustments—where registration is performed purely using digital processing means.

Figure 12:
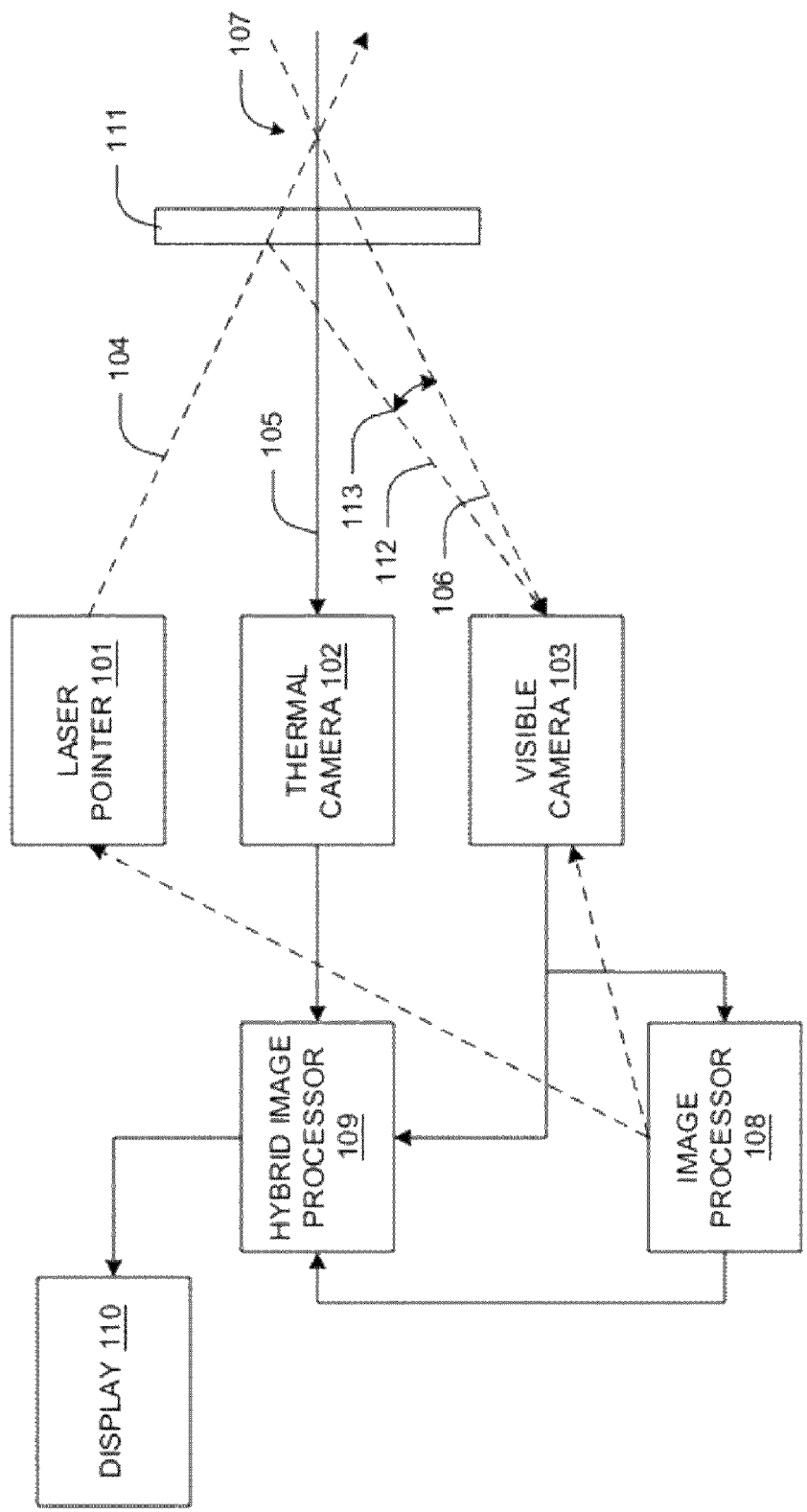
FIG. 12 is a block diagram of a system for performing alignment of thermal and visible images of a scene.

FIG. 12 is a block diagram of the device. The system is a hybrid thermal-visible camera consisting of a laser pointer 101, thermal imaging camera 102, and visible imaging camera 103 that are packaged together and have center optical axes of 104, 105, 106, respectively. These axes may meet at a common point 107 at a known distance (although this is optional, as long as the separation of spatial locations of the laser pointer, thermal camera and visible camera, and the angular directions of the three optical axes are known). When an object 111 is in front of the hybrid camera, light from the laser pointer 101 is reflected off the object 111 into the visible camera along the axis 112. The visible camera perceives (by location in the visible image) this light to emanate from a source at an angle 113 from its center axis (in this example, if the object were located at the sweet spot 107, then that angle would become zero degrees).

The visible image recorded by the visible camera 103 is passed to an image processor 108 which locates the reflected laser light (with a combination of techniques which may include finding the brightest spot along the known axis where the laser light will appear, filtering by color, and filtering by time in a system where the laser source is modulated). Once the x-y location of the laser light in the visible image is determined, the image processor using generally known geometric equations calculates an estimate of the distance to the object 111 and x- and y-offsets which are used to register the visible and thermal images. The geometric equations may include certain simplifying assumptions but in general make use of the following parameters of the system: the spatial locations of the laser pointer 101, thermal imaging camera 102, and visible imaging camera 103 relative to each other; the optical characteristics of the thermal imaging camera 102 and visible imaging camera 103 (e.g. focal length and instantaneous field of view; and the bore sight angles of the laser pointer 101, thermal imaging camera 102, and visible imaging camera 103 relative to each other.

A hybrid thermal-visible image processing unit 109 accepts thermal image information from thermal camera 102, visible image information from visible camera 103, and x- and y-offset numbers (based on object distance) from the image processor 108. The x- and y-offsets are applied to shift the visible or thermal images digitally to provide registration between the images (assumed in this case to be scaled appropriately—scaling and other corrections could also be applied according to the calculated object distance). The resulting registered thermal and visible images, or possibly a combination, are then optionally output to a display 110. In other cases the resulting imagery could be further processed, stored, or transmitted to a remote location. Variations on this basic system are possible, including implementations where the laser is modulated in a specific timing relative to the visible camera frame rate, so that the laser reflection may be more accurately extracted from the overall scene (indicated by the dotted control lines between the registration processor 108, the laser pointer 101, and the visible camera 103).

While various embodiments of the invention have been particularly shown and described, it will be understood by those skilled in the art that various changes in form and details may be made therein without departing from the spirit and scope of the invention as defined by the appended claims.

What is claimed is:

1. An imaging device, comprising:
    a first sensor operative to receive first sensor input in an infrared wavelength band from a first sensor imaging field and to generate a corresponding first sensor output signal;
    a second sensor operative to receive second sensor input in a second wavelength band from a second sensor imaging field and to generate a corresponding second sensor output signal, the second sensor imaging field containing or being larger in extent than the first sensor imaging field, the first and second imaging fields being of known spatial registration with respect to each other;
    a laser operative to emit radiation within the second wavelength band and illuminating a reflective object within the second sensor imaging field to generate reflective radiation, the reflected radiation being received by the second sensor, the laser position and direction of propagation of the laser radiation being of known spatial registration with respect to the second sensor; and
    an image processor operative to:
        (1) receive the first and second sensor output signals,
        (2) extract from the second sensor output the position of the illuminated area within the second sensor imaging field,
        (3) calculate from the position and known registration of the laser and second sensor the distance to the reflective object,
        (4) calculate from the distance and the spatial registration of the first and second sensor a registration offset,
        (5) using the registration offset to register the first and second imaging fields.

2. The imaging device of claim 1 wherein the first sensor is an infrared point thermometer.

3. The imaging device of claim 1 wherein the first sensor is a two-dimensional thermal sensor.

4. The imaging device of claim 1 wherein the second sensor output is comprised of a time succession of image frames for display.

5. The imaging device of claim 4 wherein the laser illumination is modulated.

6. The imaging device of claim 5 wherein the display of the reflective object within the second sensor imaging field is generated using frames wherein the laser is modulated to be turned off.

7. The imaging device of claim 4 wherein the image frames are processed to enhance detection of the laser illumination.

8. The imaging device of claim 1 wherein the laser is outside the human visible wavelength range.

9. The imaging device of claim 1 wherein the laser illumination consists of multiple points of illumination within the second sensor imaging field.

10. The imaging device of claim 9 wherein the multiple points are in a grid pattern.

11. The imaging device of claim 9 wherein the spatial registration offset varies across the second sensor imaging field.

12. The imaging device of claim 9 wherein the spatial registration offset is used to predict the location of changes in depth within the second sensor imaging field.

13. The imaging device of claim 9 wherein the spatial registration offset is used to predict the location of changes in depth within the first sensor imaging field.

14. The imaging device of claim 9 wherein the signal processor performs an alignment process of a succession of image frames.

* * * * *